Aug. 16, 1927.

G. WALKER 1,638,972

SHIP'S INSTRUMENT

Filed Jan. 25, 1923     5 Sheets-Sheet 2

Inventor,
George Walker;
by Roberts, Roberts & Cushman,
Attys.

Aug. 16, 1927. 1,638,972
G. WALKER
SHIP'S INSTRUMENT
Filed Jan. 25, 1923 5 Sheets-Sheet 3
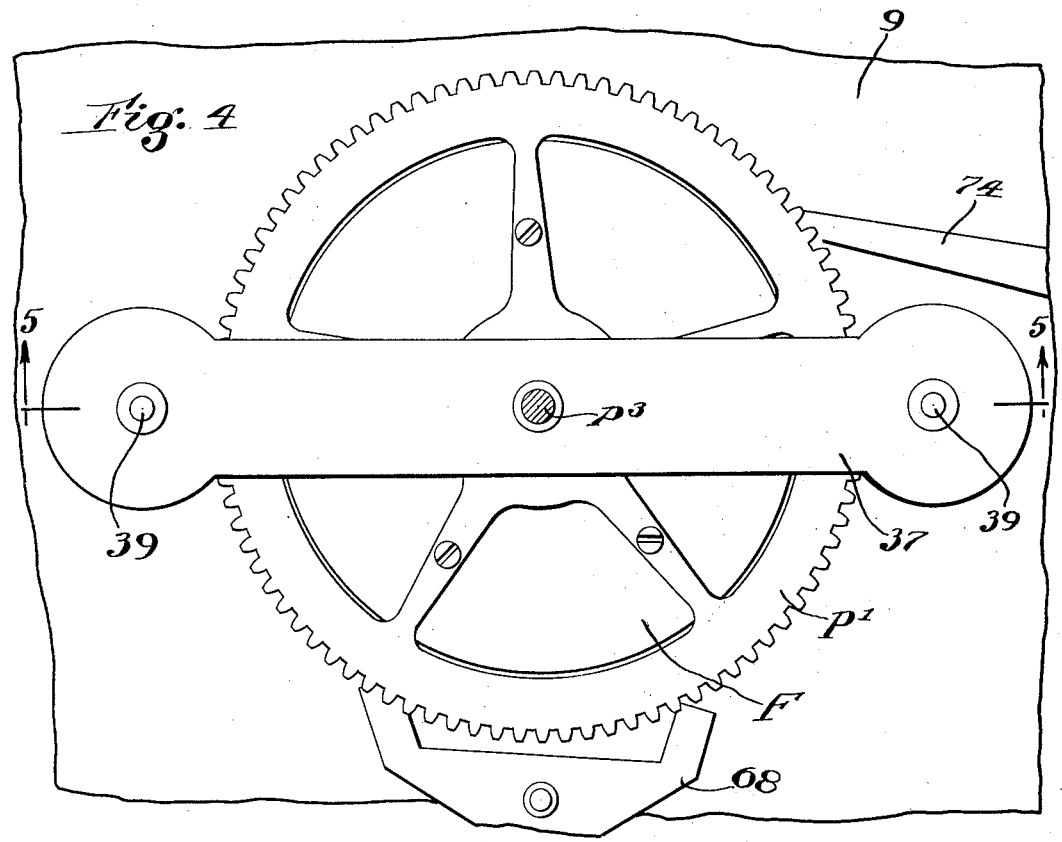
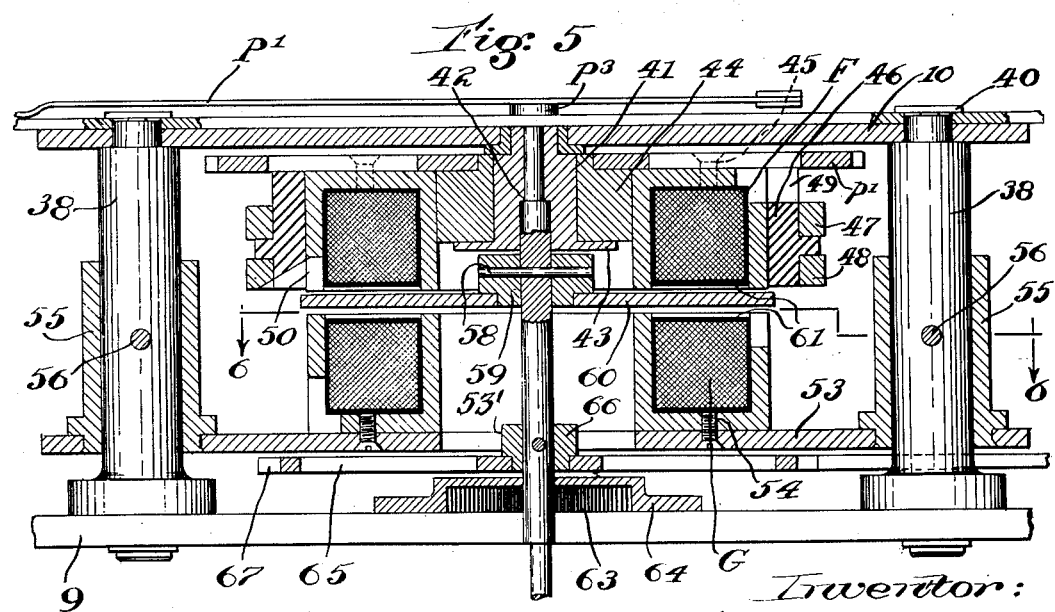
Inventor:
George Walker,
by Roberts, Roberts & Cushman,
Attys.

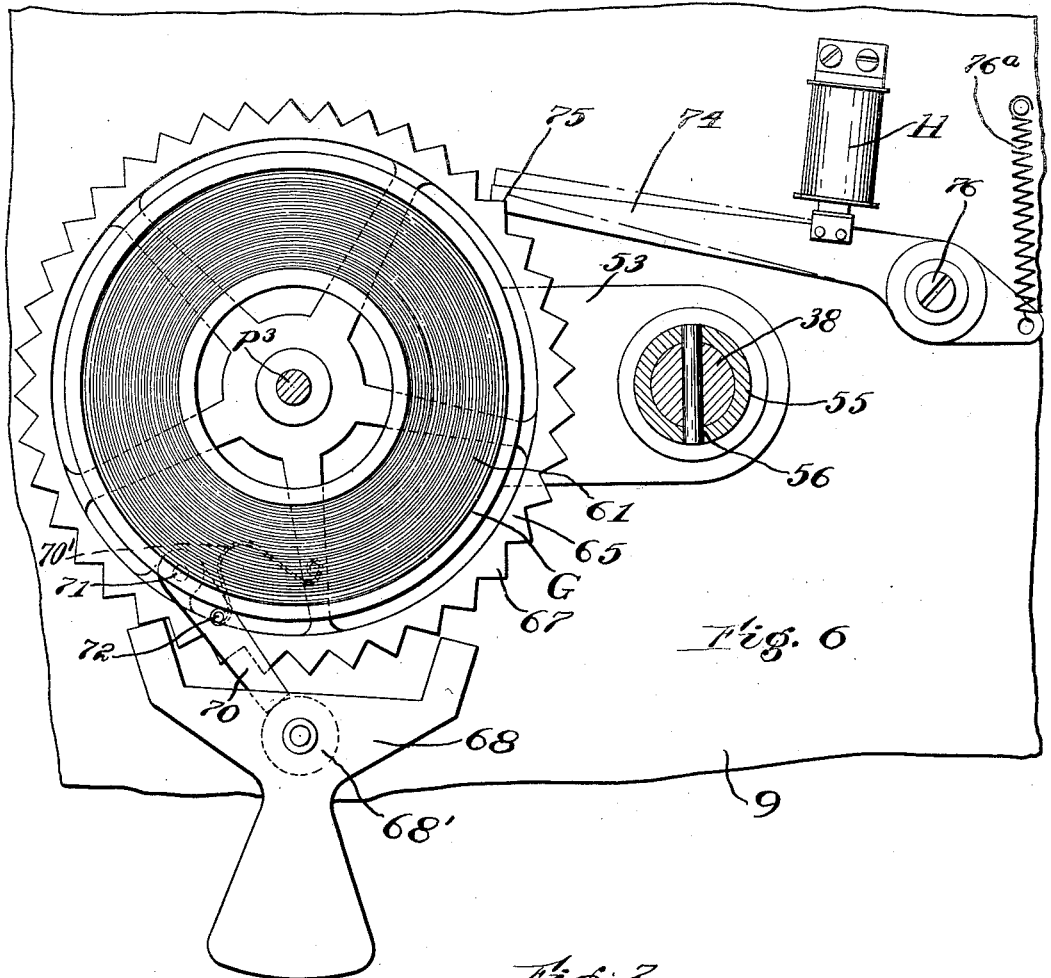
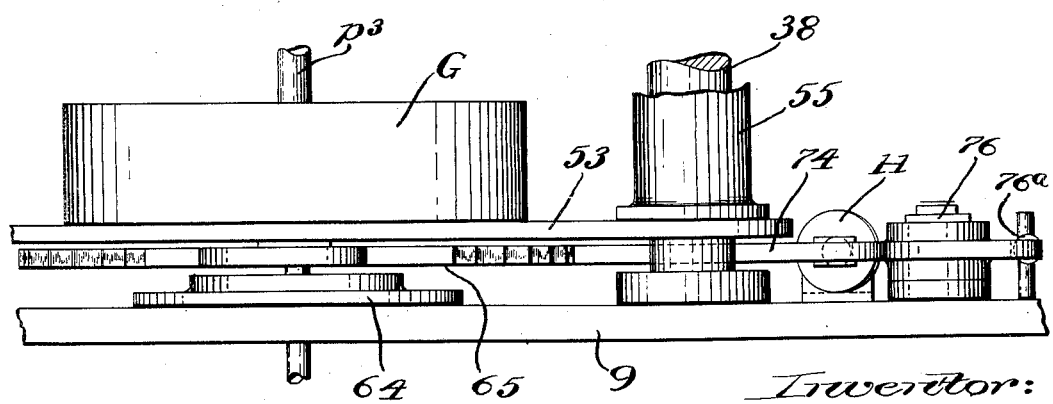

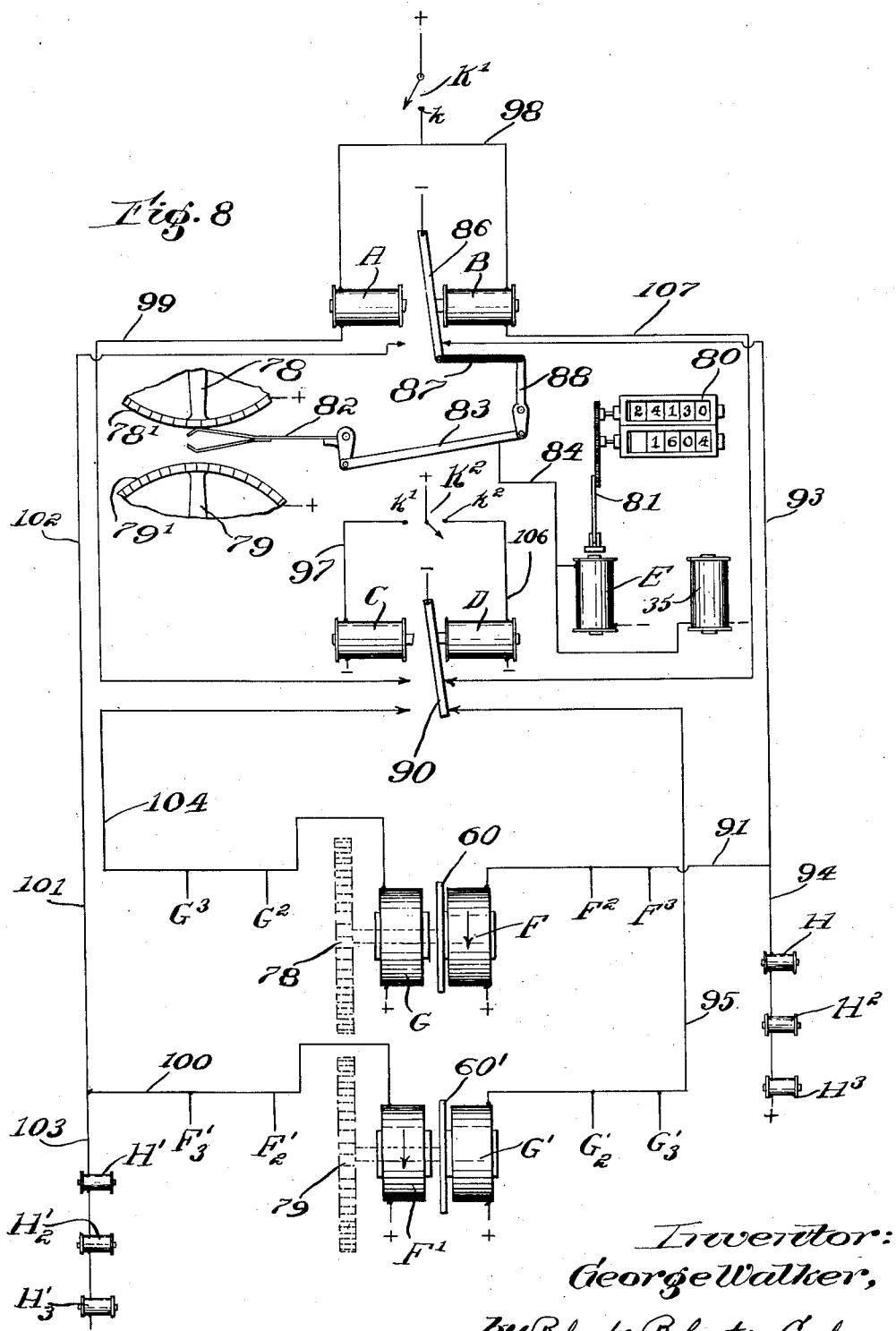

Patented Aug. 16, 1927.

1,638,972

UNITED STATES PATENT OFFICE.

GEORGE WALKER, OF NEWTON CENTER, MASSACHUSETTS.

SHIP'S INSTRUMENT.

Application filed January 25, 1923. Serial No. 614,842.

This invention relates to apparatus for indicating the speed of movement and the distance traversed by a moving object, and is particularly adapted and intended for use on ships, being a further development of the ship instruments disclosed in my copending applications Serial Nos. 273,744 and 319,392, filed January 29, 1919, and August 23, 1919, respectively, also in my copending application Serial No. 614,838 filed on even date herewith.

Objects of the invention are to provide an improved instrument for indicating the speed of rotation of driving means and for translating the speed of the driving means into a distance indication, whether the speed be constant or variable, to simplify the complicated and delicate driving mechanism heretofore employed for such instruments, and in general to render such devices more accurate and reliable in service and to overcome the defects of previous instruments of this kind.

In one aspect, the invention comprises an indicator and a rotating member adjacent the indicator and a magnetic clutching device for selectively causing the indicator to rotate with the member to indicate the speed thereof. The rotating member is preferably mounted coaxially with the indicator and the energizing of the magnetic clutch is preferably automatically controlled in a manner to cause the indicator to be actuated during alternate predetermined periods. During the periods of rest, the indicator may be retained in stopped position by suitable means such as an electromagnetic clutching device mounted in a fixed position.

In another aspect, the invention comprises mechanism for speed and distance indicating having a plurality of pairs of indicators, the pointers of each pair being actuated in alternation during predetermined periods of time in proportion to the speed of rotation of the driving or propelling means of the land, water or air vehicle on which the mechanism is mounted, and alternately held in stopped position by suitable means such as electromagnetic clutching devices automatically controlled until reset. The invention further comprises means for steadying the movement of a shaft arranged to be rotated at a speed equal or proportional to the speed of another shaft.

For the purpose of illustrating the invention, one concrete embodiment thereof is shown in the accompanying drawings, in which:—

Fig. 4 is an enlarged elevational view of the mechanism behind one of the dials shown in Fig. 1;

Fig. 5 is a sectional view substantially on the line 5—5 of Fig. 4;

Fig. 6 is a sectional view on the line 6—6 of Fig. 5;

Fig. 7 is a plan view of the mechanism shown in Fig. 6; and

Fig. 8 is a wiring diagram with certain of the mechanical elements diagrammatically illustrated.

The embodiment of the invention chosen for the purpose of illustration comprises a speed indicating and distance indicating device for use on a vehicle whether propelled on the land, sea, or in the air, and the description which follows is to be so interpreted, but for convenience the apparatus will be called a ship's instrument.

Figure 1:
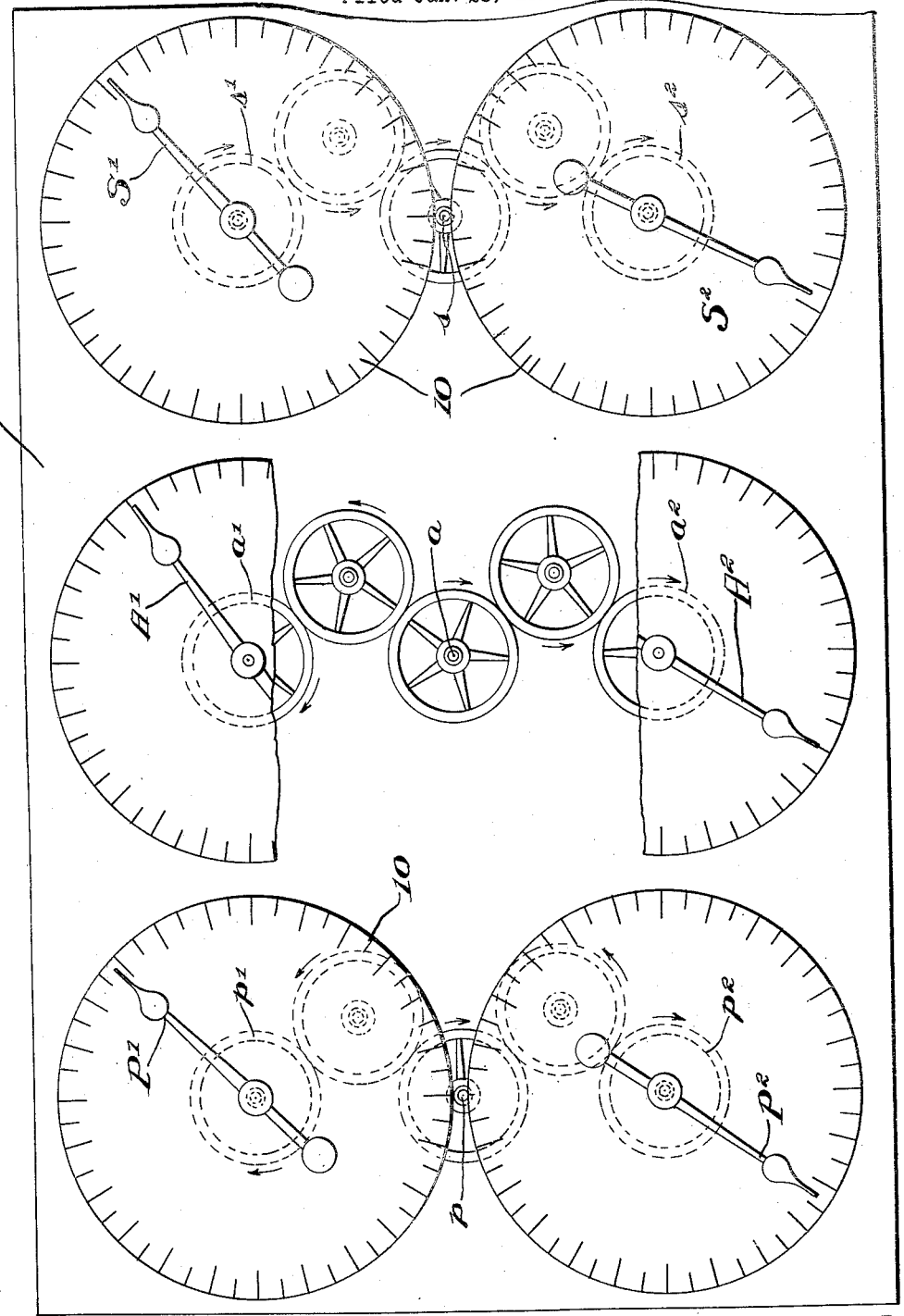
Fig. 1 is a front elevational view partly broken away of the dials and mechanism upon the front face of a supporting plate of a speed and distance measuring device embodying the features of the invention.

As indicated in Fig. 1, which shows in elevation the front face of a supporting plate 9 upon which the mechanism of the device is mounted, a plurality of graduated dials 10 are provided in pairs; there being one pair in excess of the number of propellers on the ship. In the embodiment shown the apparatus is designed for a ship having two propellers, one on the port and one on the starboard side. The pair of dials 10 on the right have indicators S' and S² adapted to be advanced at a rate proportional to speed of the starboard propeller to count the revolutions of the starboard propeller during alternate predetermined periods of time, such as alternate minutes. The pair of dials on the left have indicators P' and P² arranged to count in a similar manner the revolutions of the port propeller. The center pair of dials have indicators A' and A² to count in a similar manner the average number of revolutions of both propellers. The pointers of each set are driven respectively from shafts $s$, $a$, and $p$ through trains of gears as indicated in Fig. 1, the last gear of each train, namely $s'$, $s^2$, $a'$, $a^2$, $p'$, and $p^2$ being mounted for free turning movement upon the axis of its corresponding indicator. The driving connection and the manner of closing and breaking the same will be later set forth.

Figures 2, 3:
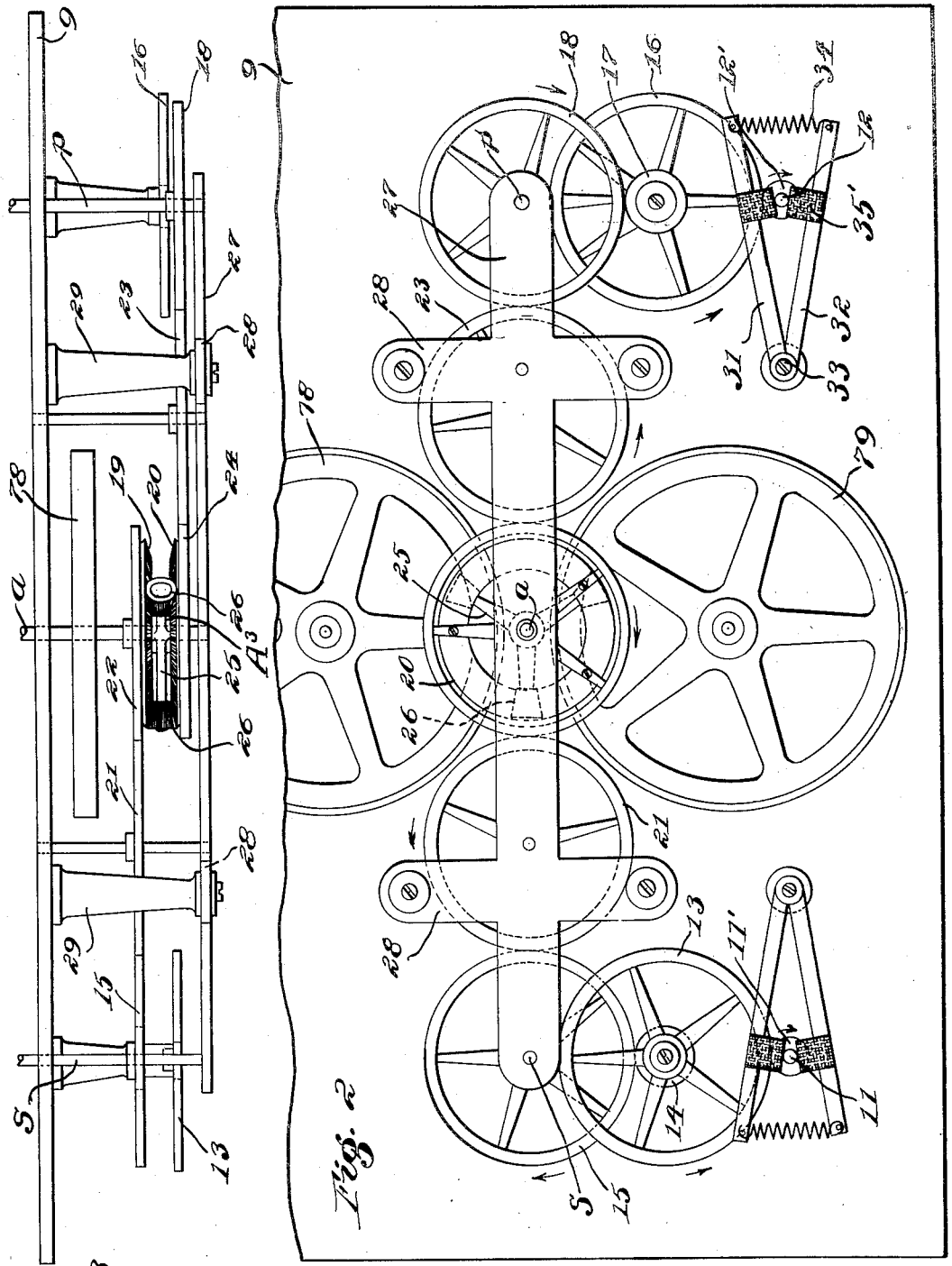
Fig. 2 is an elevational view of the mechanism on the opposite side of the supporting plate to that shown in Fig. 1.
Fig. 3 is a plan view of the mechanism shown in Fig. 2.

Referring now to Figs. 2 and 3, wherein is disclosed the mechanism on the rear of supporting plate 9, the connections by which the shafts $s$, $a$ and $p$, are constantly driven at rates proportional to the speed of the propellers will be described. Shafts $s$ and $p$ may be driven by suitable gearing directly from the starboard and port propeller shafts if desired, but since the instrument will ordinarily be mounted at a point remote from such propeller shafts, as in the navigating room, means driven synchronously with the propellers and at the same or proportional speed thereto are preferably provided. Such means may comprise shafts 11 and 12 which may be driven in any suitable manner and by any known mechanism through mechanical, pneumatic or electric connections either continuously or intermittently. Shaft $s$ is driven from shaft 11 through the train of gears comprising a gear 11' on shaft 11, gear 13 in mesh therewith having a smaller gear 14 in mesh with gear 15 on shaft $s$. In a similar manner shaft $p$ is driven from shaft 12 through a gear 12' thereon in mesh with gear wheel 16 carrying a smaller gear 17 which meshes with gear wheel 18 on shaft $p$. Shaft $a$ is driven at the average speed of shafts $p$ and $s$ through a differential $A^3$, the bevelled gears 19 and 20 of which are loosely mounted for free rotation upon shaft $a$ and are respectively driven by shafts $s$ and $p$ through gears 15, 21 and 22 and 18, 23 and 24 respectively, gears 22 and 24 being fast on bevelled gears 19, 20 respectively. Shaft $a$ carries arms 25 having bevelled pinions 26 mounted thereon in mesh with both of the bevelled gears 19 and 20 whereby said pinions serve as followers in the differential $A^3$ in advancing shaft $a$ at the average speed of shafts $s$ and $p$. Any suitable supporting means may be provided having bearings for shafts $s$, $a$ and $p$ and the intermediate gears such as bearing plate 27 having cross-bars 28 supported in spaced relation to base plate 9 by posts 29.

Suitable means are preferably provided for steadying the rotation of the shafts, one form of such apparatus being disclosed in Fig. 2 in which arms or levers 31 and 32 are provided mounted on a suitable pivot 33, the free ends of the arms being yieldingly drawn or held together by resilient means such as a coil spring 34 for the purpose of applying a balanced yielding pressure upon shafts 11 and 12 respectively, preferably through contact blocks 35' of suitable material such as hard rubber or bakelite which bear directly upon shafts 11 and 12, as indicated. The yielding braking effect thus produced, which may be adjusted by using springs of different strengths, prevents overthrow of the shafts and renders the rotation thereof steady and uniform.

The mechanism by which the various indicators are caused to rotate to count the revolutions of the propelling means, to be stopped and held in stopped position to indicate the propeller speed, and to be reset prior to being again connected with the driving mechanism, will now be set forth, reference being had to Figs. 4 and 7 inclusive. Since the mechanism is identical for the indicator on each dial, disclosure of but one will be made in detail, as for example the mechanism for operating the pointer $P'$, which is mounted upon the shaft $p^3$. As indicated in Figs. 4 and 5 shaft $p^3$ has its bearings in supporting plate 9 and in a spanner plate 37 supported in spaced relation to plate 9 by posts 38. Openings 39 in the outer ends of posts 38 provide means for securing the dial 10 in place as by screws 40. As previously described, the gear $P^1$ which is continuously driven from shaft $p$ through the train of gears disclosed in Fig. 1 is mounted for free rotation on shaft $p^3$ through the provision of a hub 41 engaging the shaft $p^3$ on both sides of a shoulder 42 thereon, the hub 41 having an annular member 44 secured thereon as by means of a flange 43 on said hub. Mounted upon the annular member 44 is an electromagnet F which is preferably circular in form and mounted concentric with shaft $p^3$ and to the frame of this magnet the gear wheel $p'$ is secured as by screws 45. Upon the electromagnet F is mounted an annulus 46 of insulating material carrying on its outer periphery two contact rings 47 and 48 which have electrical connections to the winding of the electromagnet F through suitable openings or recesses 49 and 50 in the annulus 46 and the magnet frame, the contact rings 47 and 48 serving as means for completing the circuit from a source of power to the windings of the magnet through suitable brushes not shown. Opposed to magnet F is another electromagnet G which may also be circular in form and which is immovably mounted upon the frame of the apparatus by means of a plate 53 to which the magnet may be secured by suitable means such as screws 54. Plate 53 has an opening 53' through which shaft $p^3$ passes and is supported in any suitable manner as by sleeves 55 which engage posts 38 and are held in fixed position thereon by pins 56. Keyed to shaft $p^3$ by suitable means such as a pin 58 extending through a hub 59 is a plate 60, preferably circular in form and arranged to be interposed between the spaced electromagnets F and G to serve as a common armature therefor. The bearings for the shaft $p^3$ permit a slight amount of play so that the armature plate 60 may be drawn against the face of either of the magnets F and G. To prevent the armature plate from adhering to the electromagnets after the same have been deenergized the faces of these magnets are preferably covered with a sheet 61 of suitable diamagnetic material, such as heavy oiled paper, cardboard, fiber board, celluloid or the like.

In the operation of the device, electromagnet F serves as a magnetic clutch for causing the indicator P' to rotate with the gear $p'$ during a predetermined period. At the close of this period the magnet F is deenergized and the magnet G simultaneously energized so that the armature plate 60 released by the magnet F is immediately clamped to magnet G, thus retaining indicator P' in the position in which it is stopped at the end of the predetermined period. Shortly before the end of a following predetermined period during which the companion indicator or indicator $P^2$ is operating, magnet G is deenergized and the indicator P' is reset to initial position.

The resetting mechanism may comprise a resetting spring 63 having one end thereon secured to the shaft $p^3$, the spring being housed in a suitable casing 64 attached to supporting plate 9. One form of resetting spring which is preferably used by reason of the fact that it will not break if, through accident, an indicator continues to rotate for a considerable time in a forward direction consists of a coiled spring which is anchored at one end and which frictionally engages the casing 64 at the opposite end. To steady the movement of the pointer P' and to prevent the too rapid rotation of the shaft $p^3$ when reset, suitable means are provided, such as an escape wheel 65 having its hub 66 keyed to the shaft $p^3$ and having upon its periphery teeth 67 of suitable form engaged by an escape lever 68 pivotally mounted upon supporting plate 9. Stop mechanism is provided on escape wheel 65 to arrest the resetting movement of shaft $p^3$ at the initial position of the indicator comprising a lever or arm 70 pivoted at 71 to wheel 65 adjacent the periphery thereof, the lever being yieldingly held by a spring 70' in an outwardly disposed position defined by a stop pin 72 thereon which engages the rim of wheel 65, (see Fig. 6) so that the extremity of the lever abuts the post 68' upon which the escape lever 68 is pivoted. Obviously lever 70 does not interfere with the rotation of shaft $p^3$ in an indicating direction since the lever will then ride over the post 68', but only functions as a stop when the shaft is reset. Rebound of shaft $p^3$ when reset is prevented by a lever 74 having a notch 75 adapted to engage teeth 67 on escape wheel 65, lever 74 being pivoted at 76 to plate 9 and yieldingly urged into engagement with the escape wheel by coil spring 76ª. A solenoid H is arranged to withdraw and to hold the lever 74 out of engagement with escape wheel 65 when indicator P' is moving in an indicating direction.

For the purpose of indicating the distance traversed by the ship, distance indicating wheels 78 and 79 (Figs. 2 and 8) are mounted on the shafts of average speed indicators A' and $A^2$ at the back of plate 9 to translate the average speed of the propelling means into a distance indication. These distance wheels have a plurality of electrical contacts 78' and 79' on the periphery thereof (Fig. 8) representing units of distance traversing at various propeller speeds and are preferably of the type described in detail in my copending application Serial No. 614,838, filed on even date herewith. As diagrammatically indicated in Fig. 8, distance wheels 78 and 79 alternately but continuously operate a distance counting device 80 which is actuated through a ratchet connection controlled by electromagnet E, the electrical circuit thereto being through a double spring contact arm 82 which engages the contacts 78' and 79' on wheels 78 and 79 respectively, lever connection 83 therefor, conductor 84 to electromagnet E to ground. A magnet 35 may be connected in parallel with magnet E to actuate a compass recorder as disclosed in Serial No. 614,839, filed on even date herewith.

The general operation of the instrument is substantially the same as set forth in my previously filed applications; i. e. the upper and the lower rows of indicators register in alternation the speed of the various propellers and of the ship. As indicated by the position of the parts in Fig. 1, the indicators in the upper row are counting the revolutions of the ship's propellers, and the indicators in the lower row are held in stopped position to show the speed during the preceding interval such as one minute. Just before the end of the interval, the lower row of indicators are reset to initial or normal position, and at the end of the interval the upper row of indicators are stopped and held in stopped position by the energization of the fixed magnetic clutches while the lower row of indicators are simultaneously started through the energization of the rotating magnetic clutches.

Fig. 8 diagrammatically indicates the electric connections and apparatus by which the device is automatically operated continuously to give a speed and distance indication of the progress of the ship. The changes in circuits by which the pairs of indicators are alternately connected to the driving means are controlled by chronometer switches K' and K². Chronometer switch K' has one point of contact which is closed at the end of each interval, and chronometer switch K² has two contact points which are closed just before the ends of alternate intervals respectively. These chronometer switches may be operated by the same chronometer as disclosed in my copending application Serial No. 614,838.

The chronometer switch K' controls the operation of the distance indicating apparatus and of the magnetic clutching devices through opposed magnets A and B which in turn control a switch in the form of an arm or lever 86, and the chronometer switch K² operates a similar armature switch 90 which controls magnets A, B, G, G', etc. Since the contacts K, K', and K² are closed only momentarily and since the armature switches 86 and 90 actuated thereby close circuits which must continue closed until another actuation, the armature switches 86 and 90 may take the form of any of the well-known double throw switch devices in which the moving arm is yieldingly retained in the position to which it is thrown until positively thrown to its other position. The lever or relay 86 operates, by means of insulated link 87, lever 88 and a second link 83, the spring contact member 82 of the distance indicating mechanism.

While the diagram as shown on Fig. 8 is arranged to provide that all of the indicators in the upper row of each pair thereof shall operate simultaneously while the lower row is retained in stopped position and vice versa, for the sake of convenience the magnets F and G and F' and G' for but one pair of indicators is shown, the connections or leads to the other magnets of the upper set and lower set of indicators being indicated by reference characters F², F³, G², G³, F'₂, F'₃, G'₂ and G'₃. The magnets for controlling the stop pawls 74 (see H in Figs. 6 and 7) are indicated at H, H', H², H'₂, H³ and H'₃, these magnets corresponding to F, F' F², F'₂, F³ and F'₃, respectively.

The operation of the apparatus according to the diagram is as follows:

With the parts in the positions shown magnets E and 35 are operating under the control of upper wheel 78. Just before the end of the contemporaneous minute or other interval chronometer switch K² closes circuit through magnet C, (contact k' and conductor 97) thereby shifting armature 90 to its alternate position (1) to condition circuit 99 to energize magnet A when switch K' closes at the end of the interval and deenergizing magnet G' (by breaking the circuit 95 at 90) to release armature 60' to permit lower wheel 79 to be reset by its resetting spring, and (2) to energize magnet G through 104. However, armature 60, being in contact with magnet F, remains in frictional engagement therewith until the latter is deenergized. At the end of the interval chronometer switch K' closes circuit through magnet A to shift armature 86 to its left-hand position, thereby simultaneously effecting three changes, viz: deenergizing magnet F (by breaking circuit 86, 93, and 91) thereby permitting magnet G (through circuit 86, 99, 90, and 104) to shift armature 60 from the rotating magnet F to the stationary magnet G and thereby stopping and holding the upper wheel 78; energizing magnet F' (through circuit 86, 101 and 100) magnetically to clamp armature 60' thereto and thereby start lower wheel 79; and shifting switch 82 from the upper wheel 78 to the lower wheel 79, thereby placing the magnets E and 35 under the control of lower wheel 79 for the next interval. Just before the end of this interval chronometer switch K² contacts k², thereby shifting armature 90 to its right-hand position to effect the following changes, viz: magnet G is deenergized to permit the upper wheel 78 to reset, and the circuit of magnet G' is closed. At the end of the interval chronometer switch K' closes the circuit of magnet B, thereby throwing armature 86 to its right-hand position simultaneously to effect the following changes, viz: magnet F' is deenergized and magnet G' acts on armature 60' to stop and hold lower wheel 79; magnet F is energized to start the upper wheel 78; and switch 82 is shifted from lower wheel 79 to upper wheel 78. Thus magnets E and 35 are continuously but alternately controlled by wheel 78 and 79.

From the above it will be apparent that the speed indicating and distance indicating mechanism herein disclosed is characterized by a small number of moving parts and a simplicity of operation which enhances greatly its freedom from mechanical disarrangement and its accuracy in operation, that the throwing into and out of the driving connection is accomplished without the meshing of gears with the chipped and broken teeth or deformed wheels which often result from failure of the teeth to mesh, that by the use of electromagnetic clutching devices the drive of the indicators is positive, that lost motion and delay in making the driving connection is entirely eliminated and that the holding magnet retains the indicator in exactly the position in which it stopped.

I claim:

1. A ship's instrument comprising speed-controlled means constantly operated in proportion to the speed of the ship-propelling means, an oscillatory member adjacent said speed controlled means, means including a magnetic clutch for making a driving connection between said member and said speed-controlled means for a predetermined period, means for breaking said connection at the end of said period and holding said member stationary for a second predetermined period, and means for resetting said member to initial position at the end of the second period.

2. A ship's instrument comprising a pair of revolution counters, speed-controlled means operated in proportion to the speed of the ship propelling means associated with said counters, means for alternately connecting and disconnecting the counters of said pair to and from said speed-controlled means including magnetic clutch devices, and means for resetting said counters after being disconnected from said speed-controlled means.

3. A ship's instrument comprising means operated in proportion to the speed of each of the ship propellers, means operated in proportion to the average speed of all of the propellers, a pair of indicators associated with each of said means, mechanism including magnetic clutch devices for alternately connecting the indicator of said pairs with said means, and means for resetting each of said indicators when disconnected.

4. In a device of the class described, a rotating member, an indicator member having a shaft concentric with said rotating member, and electromagnet means on one of said members for clutching said members together whereby said indicator member may indicate the speed of said rotating member.

5. In a device of the class described an indicator adapted to be rotatively advanced in one direction, resetting means for said indicator yieldingly urging it to initial position, means for actuating said indicator during recurrent periods of time to give an indication of the speed of a moving body, and electromagnetic means for retaining said indicator in the position in which it is disengaged by said actuating means until near the beginning of the next period.

6. A ship's instrument comprising a rotatable indicator, means for yieldingly urging said indicator to initial position, a stationary member and a rotating member adjacent said indicator, and means for gripping said indicator to either of said members whereby it may be caused to rotate with the first or held stationary with the second.

Signed by me at Boston, Massachusetts, this 27th day of December, 1922.

GEORGE WALKER.